UNITED STATES PATENT OFFICE.

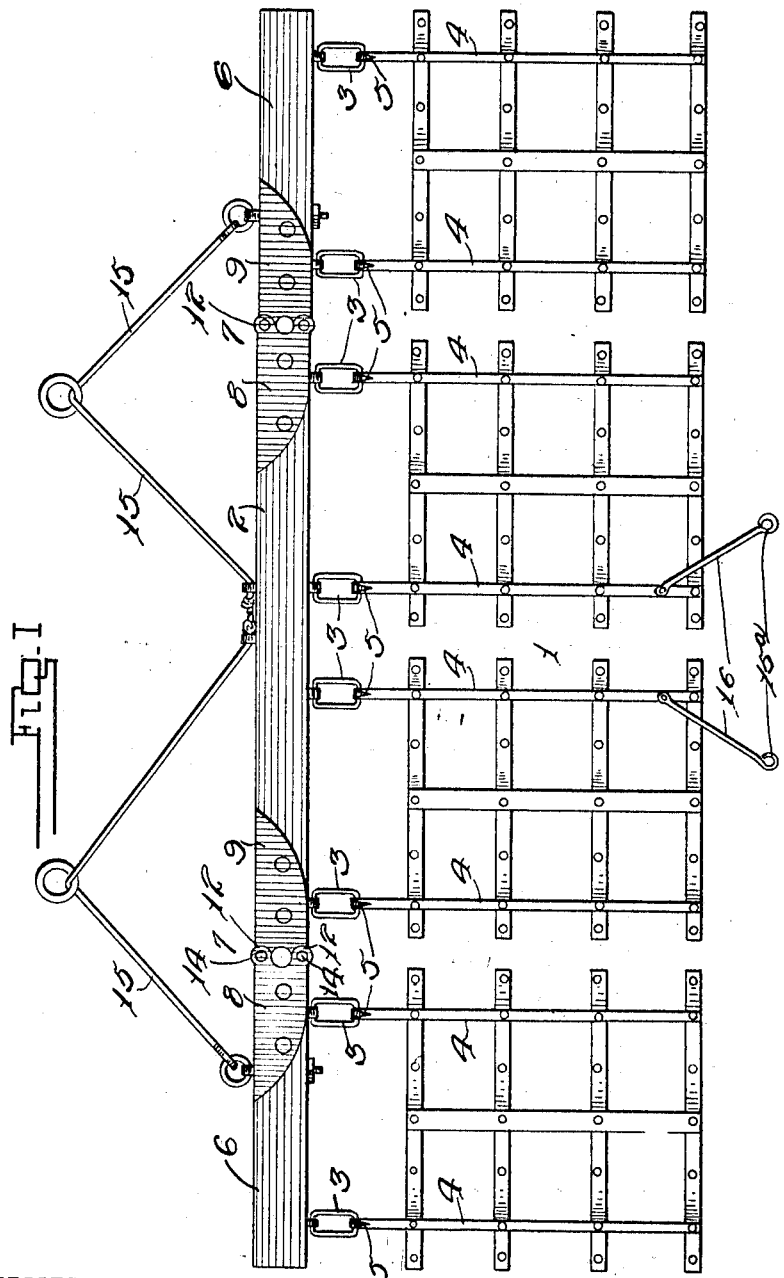

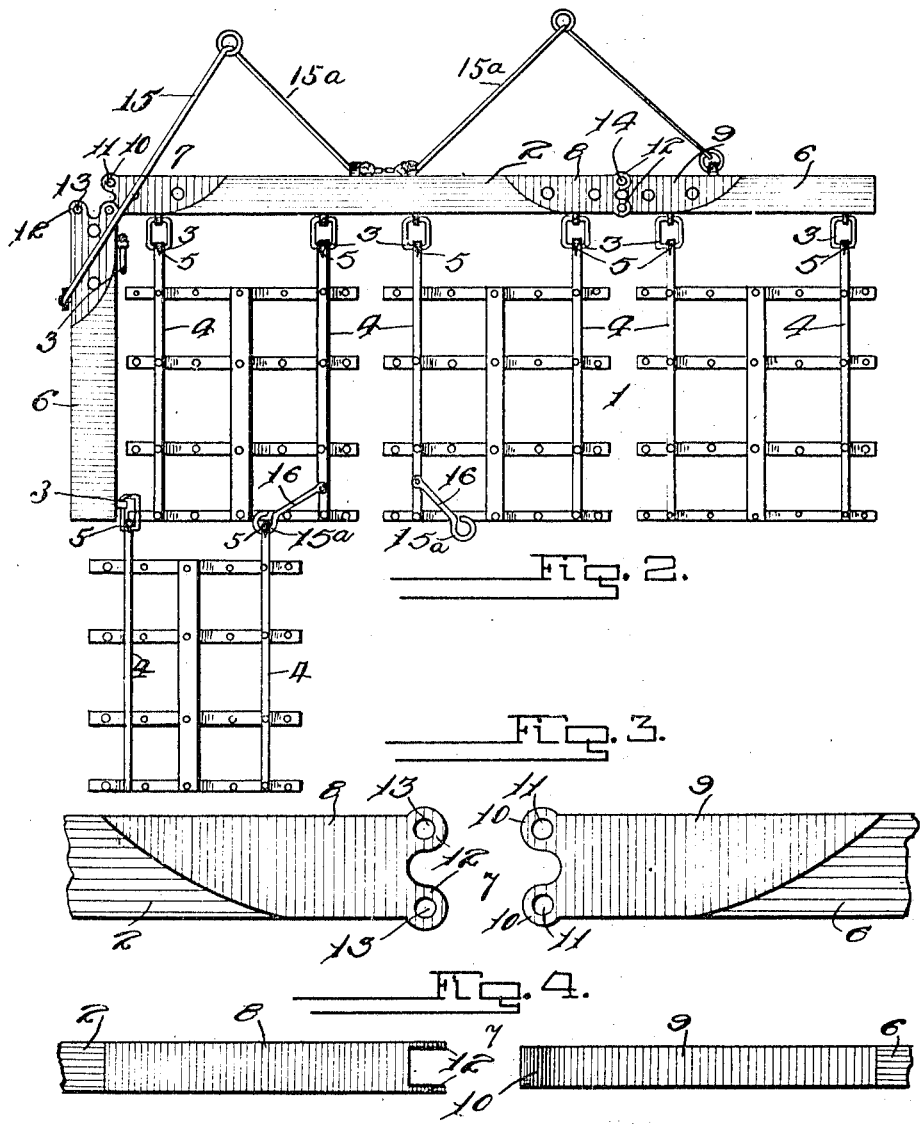

PETER FISCHER, OF CARROLL, IOWA, ASSIGNOR OF ONE-HALF TO ANDREW KIRSCH, OF CARROLL, IOWA.

HARROW-FOLDING DEVICE.

1,051,835.  Specification of Letters Patent.  Patented Jan. 28, 1913.

Application filed October 12, 1911. Serial No. 654,300.

*To all whom it may concern:*

Be it known that I, PETER FISCHER, a citizen of the United States, residing at Carroll, in the county of Carroll and State of Iowa, have invented certain new and useful Improvements in Harrow-Folding Devices, of which the following is a specification, reference being had therein to the accompanying drawing.

This invention relates to harrows and has for its object to so arrange and connect a number of harrows that they may extend in a transverse line and when necessary to reduce the width of said line a portion of said harrows may be moved to positions which will reduce the width of the transverse line of harrows.

The invention further has for its object to provide a gang of harrows so connected and arranged with reference to the draft bar of the gang of harrows that the draft bar may be reduced in length and a portion of said harrows moved to the rear of the gang of harrows.

Referring to the accompanying drawings: Figure 1 is a plan view of a gang of harrows connected to a draft bar and arranged in accordance with this invention. Fig. 2 is a plan view of a gang of harrows connected to a draft bar and arranged in accordance with this invention, and showing a portion of said harrows located behind the other harrows. Fig. 3 is a plan view of the hinge constructed in accordance with this invention with its members separated. Fig. 4 is an edge view of the hinge.

In carrying out the invention a number of quadrilateral harrows 1 of any suitable shape and construction are arranged in line, each of said harrows being connected in any suitable manner to a draft bar 2, and, as here shown, preferably by means of links 3 secured to the bar 2 and rods 4 on the harrows 1, having at one end a hook 5 which engages the loop 3. Under certain circumstances it may become necessary to reduce the length of line of harrows, or, in other words, to reduce the widths of the gang of harrows so that they may pass through a gate or other narrow passageway and also where it is desirable to have harrows located behind harrows. For this reason the draft bar 2 is formed with a hinged section 6 at each end which is connected to the main portion of the bar 2 by a suitable hinge, and, as here shown, preferably by means of the hinge 7 consisting of the members 8 and 9, each formed of a box shape to fit over the section 6 and the main portion of the bar 2 and secured in place by rivets or other suitable means. The member 9 is formed with the projections 10 each having a hole 11 and the member 8 is formed with pairs of projections 12, each having a hole 13, the projections 10 being seated between the projections 12 with the holes 11 in the projections 10 being in alinement with the holes 13 in the projections 12. The parts are connected together by a pin 14 extending through the hole 11 in each projection 10 and through the holes 13 in each pair of projections 12 on the members 8 and 9. When it is desired to reduce the width of the gang of harrows one of the pins 14 is removed from the members 8 and 9 so that the sections 6 may be swung to the side of the gang of harrows, as shown in Fig. 2.

In order to relieve the strain on the hinges and to brace the section 6 the draft rods 15 are so disposed that one of each pair is secured at one end to the main portion of the bar 2 and the other of each pair is secured to the hinged section 6. When it is desired to reduce the width of the gang of harrows one or both of the hinged sections 6 may be unfastened by removing the pin 14 and the harrow attached to the hinged section 6 is unhooked at its inner side from the link 3 and moved back to the position, shown in Fig. 2 and held in such position by the hook 5 of the inner rod 4 engaging a hook 15ª on the end of a wire or cord 16 secured to an adjacent harrow extending from the main portion of the beam 2.

It will be seen from the foregoing description that the gang of harrows may be readily increased or decreased in width.

What I claim is:—

In a gang of harrows of the character described, a harrow draft bar made in sections, the main section carrying at each end one member of a hinge, the outer draft bar sections carrying the other members of said hinges, draft links connected to the front side of said draft bar, links connected to the rear side of said draft bar, inner and outer harrow sections having hooks on their front ends detachably connected to said rear links, a hook on the rear part of an inner harrow section adapted to engage a front hook of an outer harrow section when the latter is adjusted in tandem, a hook on the trailing section being connected to a link on the draft bar.

In testimony whereof I hereunto affix my signature in presence of two witnesses.

PETER FISCHER.

Witnesses:
 ANDREW KIRSCH,
 JOHN FISCHER.